B. D. LAKE & N. G. MARKS.
MOTOR VEHICLE HEADLIGHT.
APPLICATION FILED AUG. 12, 1913.

1,107,081.

Patented Aug. 11, 1914.

Witnesses
J. H. Crawford.
V. B. Hillyard.

Inventors
B. D. Lake,
N. G. Marks.

By Victor J. Evans
Attorney

UNITED STATES PATENT OFFICE.

BENJAMIN D. LAKE AND NATHANIAL G. MARKS, OF SPRINGFIELD, KENTUCKY, ASSIGNORS OF ONE-FOURTH TO JOHN G. HARRIS AND ONE-FOURTH TO JAMES C. STONE, BOTH OF SPRINGFIELD, KENTUCKY.

MOTOR-VEHICLE HEADLIGHT.

1,107,081.     Specification of Letters Patent.     Patented Aug. 11, 1914.

Application filed August 12, 1913. Serial No. 784,358.

*To all whom it may concern:*

Be it known that we, BENJAMIN D. LAKE and NATHANIAL G. MARKS, citizens of the United States, residing at Springfield, in the county of Washington and State of Kentucky, have invented new and useful Improvements in Motor-Vehicle Headlights, of which the following is a specification.

The invention relates to headlights for motor vehicles which is connected with the steering mechanism to move therewith for throwing the beams of light in advance of the vehicle to illuminate the roadway whether such vehicle is going straight ahead, turning a corner or rounding a curve.

The invention consists of a positive connection between the steering post and headlight to insure a responsive movement of the light in each direction, thereby preventing any lost motion.

The invention further consists of an arm adjustably connected with the steering post, an elbow lever having one arm connected with the headlight, and a link connecting the other arm of the lever with the arm secured to the steering post, said link having a universal or ball and socket connection at its ends with the respective arms to admit of the parts readily adapting themselves to the line of strain without producing any binding action.

The invention consists of the novel features, details of construction and combination of parts, which hereinafter will be more particularly set forth, illustrated in the accompanying drawing, and subsequently claimed.

Figure 1:
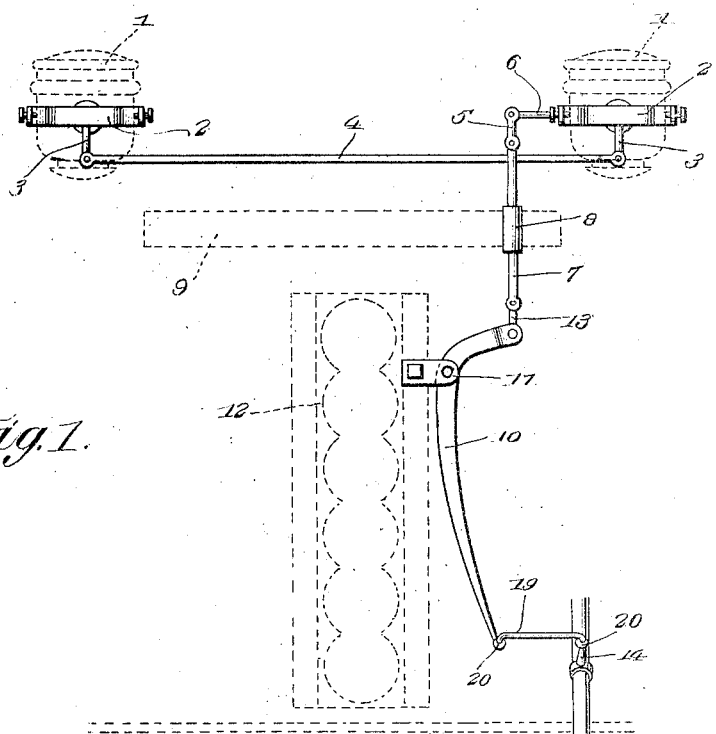
Figure 2:
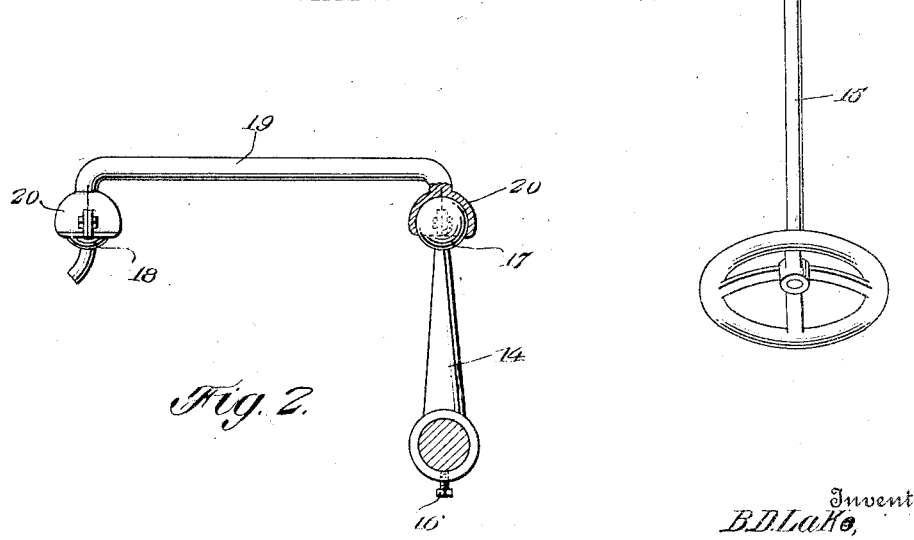

Referring to the drawing, Figure 1 is a diagrammatic view showing the application of the invention. Fig. 2 is a detail view showing the link connection between the arm secured to the steering post and the arm of the lever by means of which movement is transmitted from the steering mechanism to the headlight.

Corresponding and like parts are referred to in the following description, and indicated in all the views of the drawing, by the same reference characters.

The numeral 1 designates the side lamps of an automobile or motor vehicle which constitute the headlight. The lamp supports 2 are mounted so as to turn about vertical axes, each of such supports having an offstanding arm 3 and which arms are connected by means of a rod 4 to cause both lamps to move together. A link 5 connects an arm 6 projecting from one of the lamp supports 2 with a rod or bar 7 which is mounted in a guide 8 set into the radiator 9, or other convenient part of the vehicle.

The numeral 10 designates a lever of elbow form which is pivoted at or near the elbow to a bracket 11 secured to the frame of the engine 12 or other convenient part of the machine. The elbow lever 10 is arranged with its long arm extending lengthwise of the vehicle and its short arm crosswise of the vehicle and connected by means of a link 13 with the rod or bar 7. An arm 14 is mounted upon the steering post 15 and is secured thereto in the required adjusted position by means of an adjusting screw 16. The arm 14 terminates in a ball 17. The long arm of the lever 10 terminates in a ball 18. A link 19 connects the arm 14 with the long arm of the lever 10 and is provided at its ends with sockets 20 which receive the respective balls 17 and 18. The ball and socket joints between the link 19 and the respective arms of the parts 10 and 14 enable the link 19 to adapt itself to the direction of strain, thereby avoiding any binding.

It will be understood from the foregoing taken in connection with the accompanying drawing that a positive connection is obtained between the headlight and steering mechanism, with the result that the headlight moves quickly in response to the movement of the steering mechanism in either direction, with the result that no lost motion exists and the rays of light are at all times shed in advance of the machine to illuminate the roadway whether the vehicle is moving in a straight course or is turned to the right or left.

From the foregoing description, taken in connection with the accompanying drawing, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the invention as claimed.

Having thus described the invention what is claimed as new, is:—

1. In a device of the character described, in combination, a support, brackets carried by said support, two lamps rotatable in said brackets, means whereby said lamps may swing in unison, an arm extending outwardly at right angles to the axis of one of said lamps, a rod reciprocating at right angles to and being pivotally connected to said arm, means for guiding said reciprocating arm, a bell crank having one arm pivotally connected to the free end of said reciprocating rod, a stud carried by said support upon which said bell crank is fulcrumed at its inner end, a steering post, an outwardly extending crank carried by said steering post, a connecting rod between said bell crank lever and said last mentioned crank, and a knuckle joint connecting said connecting arm to said lever and crank.

2. In a device of the character described in combination a frame, a fixed guide mounted thereon, a rod reciprocating in said guide, a pair of lamps carried by said frame, said lamps arranged to swing in unison, means whereby said rod may actuate one of said lamps, a bell crank lever fulcrumed upon said frame, said lever being pivotally connected at one end to said reciprocating rod, a steering post, a connecting rod, angular offsets formed at the opposite ends of said connecting rod, a ball and socket connection interposed between said steering post and one of said offsets, and a ball and socket joint interposed between the free end of said lever and the free end of said connecting rod.

In testimony whereof we affix our signatures in presence of two witnesses.

BENJAMIN D. LAKE.
NATHANIAL G. MARKS.

Witnesses:
A. A. WEBB,
W. J. ROBERTSON.